(12) United States Patent
Sun et al.

(10) Patent No.: US 12,121,873 B2
(45) Date of Patent: Oct. 22, 2024

(54) GAS-SOLID SEPARATION STRUCTURE, FEEDING DEVICE AND ELECTROCHEMICAL DEPOSITION APPARATUS

(71) Applicant: BOE Technology Group Co., Ltd., Beijing (CN)

(72) Inventors: Shaodong Sun, Beijing (CN); Junwei Yan, Beijing (CN); Guangcai Yuan, Beijing (CN); Guocai Zhang, Beijing (CN); Shihao Dong, Beijing (CN); Lilei Zhang, Beijing (CN); Haoran Gao, Beijing (CN); Wenyue Fu, Beijing (CN); Chengfei Wang, Beijing (CN); Xiaojie Pan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 495 days.

(21) Appl. No.: 17/409,013

(22) Filed: Aug. 23, 2021

(65) Prior Publication Data
US 2022/0097010 A1    Mar. 31, 2022

(30) Foreign Application Priority Data

Sep. 29, 2020  (CN) .......................... 202022189882.4

(51) Int. Cl.
*C25D 21/04*       (2006.01)
*B01D 45/04*       (2006.01)
(Continued)

(52) U.S. Cl.
CPC ............ *B01F 35/189* (2022.01); *B01D 45/04* (2013.01); *B01F 23/59* (2022.01);
(Continued)

(58) Field of Classification Search
CPC .... B01F 35/189; B01F 35/1805; B01F 23/59; B01F 23/56; B01F 2101/22; B01D 45/04;
(Continued)

(56) References Cited

U.S. PATENT DOCUMENTS 3,260,285 A * 7/1966 Vogt .......................... B65B 1/16
                                                        53/436
3,687,176 A * 8/1972 Fernandes ............. F25B 31/002
                                                       141/286
(Continued)

FOREIGN PATENT DOCUMENTS

CN         212314926 U  *  1/2021   .............. B01F 13/10

*Primary Examiner* — Nicolas A Arnett
(74) *Attorney, Agent, or Firm* — Nath, Goldberg & Meyer; Joshua B. Goldberg

(57) ABSTRACT

The present disclosure provides a gas-solid separation structure including: a feeding pipeline including a first feeding part, a second feeding part and a first valve disposed between the first and second feeding parts; a discharge pipeline having a first opening and a second opening opposite to each other, the second feeding part extending into the discharge pipeline via the first opening; wherein an exhaust channel is formed between the second feeding part and the discharge pipeline, exhaust holes are formed in a portion of the discharge pipeline opposite to the second feeding part, and the exhaust channel is in communication with the exhaust holes. The present disclosure further provides a feeding device and an electrochemical deposition apparatus. The present disclosure can improve the problem of interference with medicine powder release caused by gases entering the discharge pipeline.

13 Claims, 2 Drawing Sheets

(51) Int. Cl.
*B01F 23/50* (2022.01)
*B01F 35/00* (2022.01)
*B01F 35/71* (2022.01)
*C25D 3/38* (2006.01)
*C25D 21/14* (2006.01)
*B01F 101/22* (2022.01)

(52) U.S. Cl.
CPC .......... *B01F 35/71805* (2022.01); *C25D 3/38* (2013.01); *C25D 21/04* (2013.01); *C25D 21/14* (2013.01); *B01F 23/56* (2022.01); *B01F 2101/22* (2022.01)

(58) Field of Classification Search
CPC .......... C25D 3/38; C25D 21/04; C25D 21/14; C25D 7/04
See application file for complete search history.

(56) References Cited

U.S. PATENT DOCUMENTS

| | | | | |
|---|---|---|---|---|
| 3,788,368 | A * | 1/1974 | Geng | B65B 63/028 |
| | | | | 141/93 |
| 4,390,284 | A * | 6/1983 | Hyde | E21B 21/062 |
| | | | | 366/40 |
| 5,275,215 | A * | 1/1994 | Derby | B65B 1/26 |
| | | | | 414/221 |
| 7,234,493 | B2 * | 6/2007 | Dietrich | B65G 53/60 |
| | | | | 141/71 |
| 9,266,078 | B2 * | 2/2016 | Murray | B01F 23/59 |
| 9,925,512 | B2 * | 3/2018 | Johnson | B01D 29/661 |
| 10,286,407 | B2 * | 5/2019 | Correia | B01D 45/16 |
| 11,745,139 | B2 * | 9/2023 | Jang | B01D 53/0407 |
| | | | | 96/151 |
| 2018/0236386 | A1 * | 8/2018 | Bauer | B01D 46/10 |

* cited by examiner

GAS-SOLID SEPARATION STRUCTURE, FEEDING DEVICE AND ELECTROCHEMICAL DEPOSITION APPARATUS

TECHNICAL FIELD

The present disclosure relates to the field of manufacturing of display products, and particularly relates to a gas-solid separation structure, feeding device and electrochemical deposition apparatus.

BACKGROUND

The electrochemical deposition process is a low-cost chemical film forming mode that can deposit a low-resistance metal layer with a thickness of 2 to 20 μm.

The conventional electrochemical deposition apparatus includes a delivering pipeline for delivering medicinal powder, a feeding interface and a stirring tank. The delivering pipeline is connected to the stirring tank via the feeding interface so that the medicinal powder is input to the stirring tank to be stirred with a solvent to form an electroplating solution for electrochemical deposition. When medicine powder is added into the stirring tank, the valve on the feeding interface is opened, via which the medicine powder enters the stirring tank, while a gas (such as steam) in the stirring tank is exhausted into the exhaust pipeline via the feeding interface, During this process, the gas in the feeding interface may interfere with feeding of the medicine powder. For example, the blown gas may blow away the medicine powder, or the gas and the medicine powder may be mixed so that the medicine powder is adhered to a pipeline wall of the feeding interface.

SUMMARY

To solve at least one of the problems in the related art, the present disclosure provides a gas-solid separation structure, feeding device and electrochemical deposition apparatus.

In order to achieve the above objects, the present disclosure provides a gas-solid separation structure, including:
- a feeding pipeline including a first feeding part, a second feeding part and a first valve disposed between the first and second feeding parts;
- a discharge pipeline having a first opening and a second opening opposite to each other, the second feeding part extending into the discharge pipeline via the first opening;
- wherein an exhaust channel is formed between the second feeding part and the discharge pipeline, exhaust holes are formed in a portion of the discharge pipeline opposite to the second feeding part, and the exhaust channel is in communication with the exhaust holes.

Optionally, a discharge port of the second feeding part has a cross-sectional area smaller than a feeding port of the second feeding part.

Optionally, the second feeding part has a cross-sectional area gradually reduced in a direction away from the first feeding part.

Optionally, the discharge pipeline is provided with a second valve spaced from a discharge port of the feeding pipeline.

Optionally, the exhaust holes are uniformly distributed along a circumferential direction of the discharge pipeline.

Optionally, the first valve is disposed at the first opening of the discharge pipeline.

Optionally, the feeding pipeline is disposed coaxially with the discharge pipeline.

Optionally, the second feeding part is made of a metal material containing no iron element or a plastic material containing fluorine.

Optionally, a height difference is provided between the exhaust hole farthest from the first feeding part and a discharge port of the second feeding part.

The present disclosure provides a feeding device, includes: a material supply source, a delivering pipeline, an exhaust pipeline, a liquid medicine stirring tank, and the gas-solid separation structure as described above;
- the feeding pipeline is in communication with the material supply source via the delivering pipeline; and
- the discharge pipeline is in communication with a feeding port of the liquid medicine stirring tank, while the exhaust holes in the discharge pipeline are in communication with the exhaust pipeline.

Optionally, the gas-solid separation structure is the gas-solid separation structure as described above, and the feeding device further includes a driver that is configured to drive the second valve to open in response to control of an exhaust control signal; and to drive the first valve to open in response to control of at least a first feeding control signal.

Optionally, the feeding device further includes a humidity detector configured to: monitor humidity within the discharge pipeline, and generate a second feeding control signal when the humidity within the discharge pipeline is lower than a preset threshold value;
the driver is further configured to drive the first valve to open in response to simultaneous control of the first and second feeding control signals.

The present disclosure further provides an electrochemical deposition apparatus including the feeding device as described above.

BRIEF DESCRIPTION OF THE DRAWINGS

Accompanying drawings are provided for further understanding of this disclosure and constitute a part of the specification. Hereinafter, these drawings are intended to explain the disclosure together with the following specific embodiments, but should not be considered as a limitation of the disclosure, in which.

DETAILED DESCRIPTION OF THE EMBODIMENTS

Hereinafter, specific embodiments of the present disclosure will be described with respect to the accompanying drawings. It will be appreciated that the specific embodiments as set forth herein are merely for the purpose of illustration and explanation of the disclosure and should not be constructed as a limitation thereof.

Unless otherwise defined, technical or scientific terms used in the embodiments of the present disclosure are intended to have general meanings as understood by those of ordinary skill in the art. The words "first", "second" and similar terms used in the present disclosure do not denote any order, quantity, or importance, but are used merely for distinguishing different components. Similarly, the word "comprising" or "comprises" or the like means that the element or item preceding the word includes elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", or the like are merely used to indicate a relative positional relationship, and when an absolute position of the described object is changed, the relative positional relationship may also be changed accordingly.

In an embodiment of the present disclosure, there is provided a gas-solid separation structure that is applicable to an electrochemical deposition apparatus. The electrochemical deposition apparatus includes a feeding device and a main process device. The main process device is configured to carry out the electrochemical deposition process, and the feeding device is configured to provide an electroplating solution for the main process device. The feeding device includes a delivering pipeline for delivering medicinal powder, a liquid medicine stirring tank, an exhaust pipeline and a gas-solid separation structure. The delivering pipeline is connected to the stirring tank via the feeding interface so that the medicinal powder is input to the stirring tank to be stirred with a solvent to form an electroplating solution for electrochemical deposition. In the feeding device, the delivering pipeline is connected to the liquid medicine stirring tank via the gas-solid separation structure, and the exhaust pipeline is in communication with exhaust holes in the gas-solid separation structure. On one hand, the medicinal powder delivered by the delivering pipeline may be added into the liquid medicine stirring tank via the gas-solid separation structure; and on the other hand, a gas in the liquid medicine stirring tank may be exhausted into the exhaust pipeline via the gas-solid separation structure.

Figure 1:
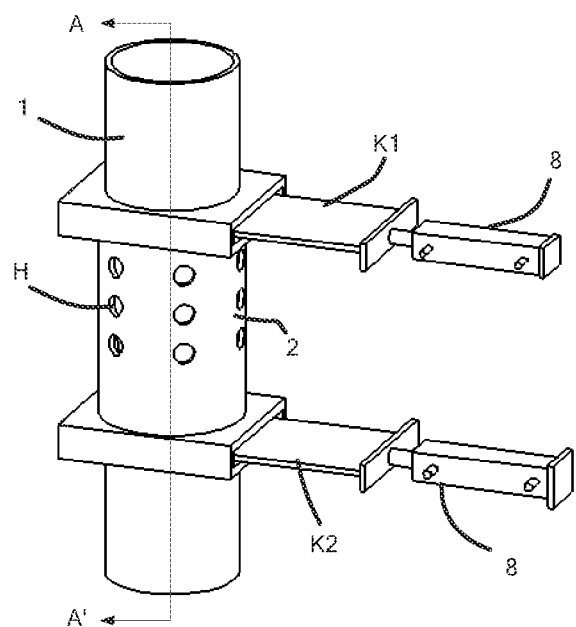
FIG. 1 is a schematic diagram of a gas-solid separation structure provided in some embodiments of the present disclosure.
Figure 2:
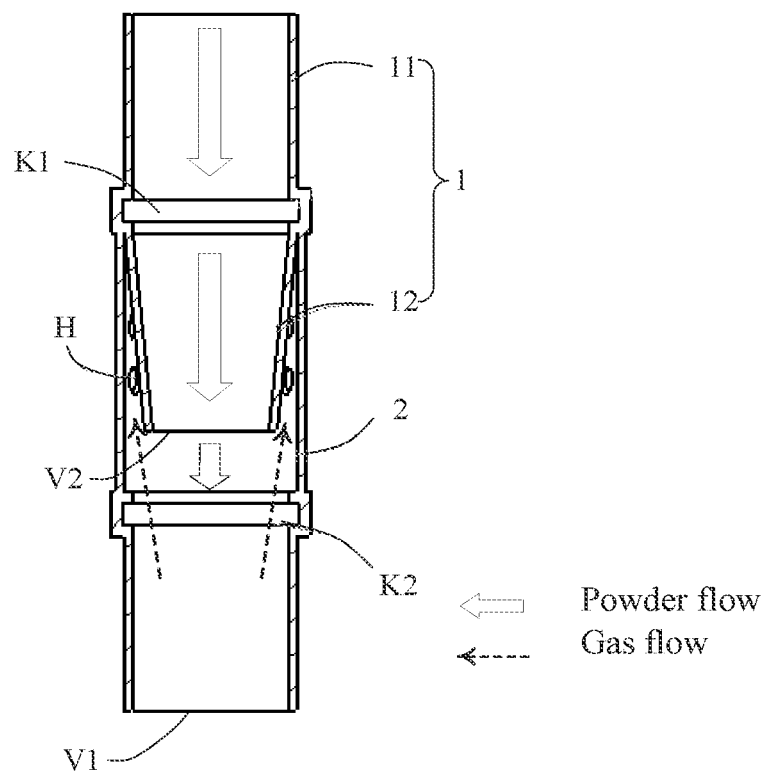
FIG. 2 is a cross-sectional view taken along line AA' of FIG. 1.

FIG. 1 is a schematic diagram of a gas-solid separation structure provided in some embodiments of the present disclosure. FIG. 2 is a cross-sectional view taken along line AA' of FIG. 1. As shown in FIGS. 1 and 2, the gas-solid separation structure includes: a feeding pipeline 1 and a discharge pipeline 2. The feeding pipeline 1 is provided with a first valve K1, and includes a first feeding part 11 and a second feeding part 12 connected to each other. The discharge pipeline 2 has a first opening (not shown) and a second opening V1 opposite to each other. In this embodiment, the first opening of the discharge pipeline 2 refers to an opening at a top end of the discharge pipeline 2, and the second opening V1 of the discharge pipeline 2 refers to an opening at a bottom end of the discharge pipeline 2. The second feeding part 12 extends into the discharge pipeline 2 via the first opening. An exhaust channel is formed between the second feeding part 12 and the discharge pipeline 2, exhaust holes H are formed in a portion of the discharge pipeline 2 opposite to the second feeding part 12, and the exhaust channel is in communication with the exhaust holes H. As shown in FIG. 2, the exhaust channel refers to a portion between a sidewall of the second feeding part 12 and a sidewall of the discharge pipeline 2, and the second feeding part 12 includes a feeding port (not shown) and a discharge port V2. The feeding port of the second feeding part 12 refers to an opening at an upper end of the second feeding part 12, and the discharge port V2 of the second feeding part 12 refers to an opening at a lower end of the second feeding part 12.

In this embodiment, as shown in FIG. 2, the first feeding part 11 may be in communication with a delivering pipeline for delivering medicine powder, and the second opening V1 of the discharge pipeline 2 may be in communication with the feeding port of the liquid medicine stirring tank. When medicine powder is added into the liquid medicine stirring tank, the first valve K1 is opened, and the medicine powder enters the liquid medicine stirring tank through the first feeding part 11, the second feeding part 12 and the second opening V1, as shown by the solid arrows (from top to bottom) in FIG. 2. Meanwhile, the gas (such as steam) in the liquid medicine stirring tank enters the discharge pipeline 2 via the second opening V1. Since an exhaust channel is formed between the second feeding part 12 and the discharge pipeline 2 and the exhaust channel is in communication with the exhaust holes H in the discharge pipeline 2, most of the gas will flow along the exhaust channel, as shown by the dotted arrows in FIG. 2, so that the solid medicine powder is separated from the gas, thereby preventing the gas from interfering with feeding of the solid medicine powder, and alleviating the problems such as gas blowing off the medicine powder or the medicine powder adhering to the sidewall of the discharge pipeline 2.

The gas-solid separation structure in the embodiments of the present disclosure is described in detail below with reference to FIGS. 1 and 2.

In some embodiments, as shown in FIG. 2, the feeding pipeline 1 is disposed coaxially with the discharge pipeline 2. A first valve K1 is provided at the first opening of the discharge pipeline. A discharge port V2 of the second feeding part 12 has a cross-sectional area smaller than a feeding port of the second feeding part 12, so as to facilitate entrance of the gas into the exhaust channel, and thus improve the separation effect of the medicine powder and the gas.

In this embodiment, the second feeding part 12 may be made of a metal material containing no iron element or a plastic material containing fluorine (PFA\PTFE\PP), so as to prevent the second feeding part 12 from being corroded, and further prolong the service life of the gas-solid separation structure.

In some specific embodiments, the second feeding part 12 has a cross-sectional area gradually reduced in a direction away from the first feeding part 11. For example, a longitudinal section of the second feeding part 12 may have a trapezoid shape or a shape similar to a trapezoid.

In some embodiments, as shown in FIG. 2, the discharge pipeline 2 is provided with a second valve K2 spaced from a discharge port V2 of the feeding pipeline 1. Specifically, the second valve K2 is disposed at a distance from a downstream side (i.e., a downstream side in a flow direction of the medicine powder) of the discharge port V2 of the feeding pipeline 1, and spaced from the discharge port V2, When no medicine powder is to be added to the liquid medicine stirring tank, the second valve K2 may be closed. At this time, the second valve K2 may prevent passage of the gas in the liquid medicine stirring tank so that the second feeding part 12 and a portion of the discharge pipeline 2 located above the second valve K2 are kept dry. Therefore, the medicine powder is prevented from adhering to the sidewall of the second feeding part 12 during the addition, while further alleviating the problem of the medicine powder adhering to the sidewall of the discharge pipeline 2.

In this embodiment, the second valve K2 may be opened first to evacuate the gas in the discharge pipeline 2, after which the first valve K1 is opened to add the medicine powder into the liquid medicine stirring tank, thereby avoiding interference of the gas to the powder to the maximum extent.

In some specific embodiments, the exhaust holes H are uniformly distributed along a circumferential direction of the discharge pipeline 2 so that the gas in the exhaust channel can be exhausted from the discharge pipeline 2 in time.

In this embodiment, a height difference is provided between the exhaust hole H farthest from the first feeding part 11 and the discharge port V2 of the second feeding part 12, so as to prevent the medicine powder from being blown out of the exhaust hole H by the gas.

Figure 3:
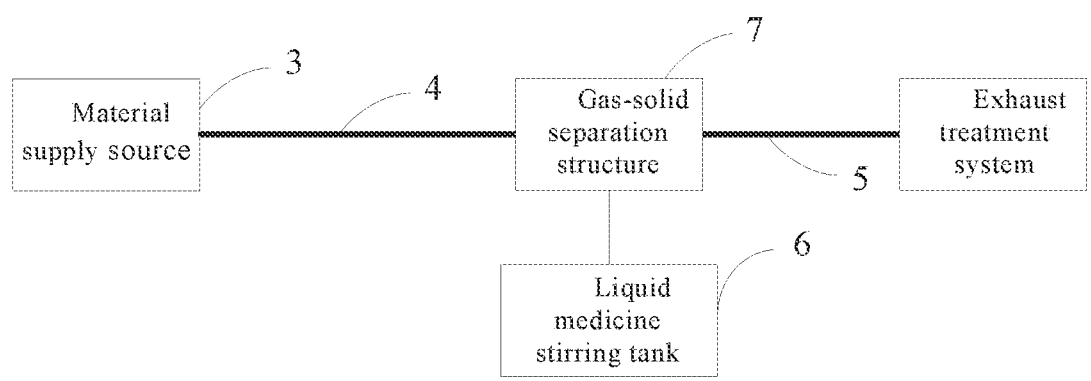
FIG. 3 is a schematic diagram of a feeding device provided in some embodiments of the present disclosure.

In an embodiment of the present disclosure, there is further provided a feeding device. FIG. 3 is a schematic diagram of a feeding device provided in some embodiments of the present disclosure. As shown in FIGS. 1 to 3, the feeding device includes: a material supply source 3, a delivering pipeline 4, an exhaust pipeline 5, a liquid medicine stirring tank 6, and a gas-solid separation structure 7 which may be the structure described in any of the above embodiments. The feeding pipeline 1 is in communication with the material supply source 3 via the delivering pipeline. The discharge pipeline 2 of the gas-solid separation structure 7 is in communication with a feeding port of the liquid medicine stirring tank 6, while the exhaust holes H in the discharge pipeline 2 are in communication with the exhaust pipeline 5.

In this embodiment, the feeding pipeline 1 may be in communication with the delivering pipeline 4 via a flange, and the discharge pipeline 2 may be in communication with the feeding port of the liquid medicine stirring tank 6 via a flange. The discharge pipeline 2 may be sleeved with an outside exhaust casing; which forms an exhaust chamber with the discharge pipeline 2. The exhaust chamber is in communication with the exhaust holes H in the discharge pipeline 2, while the exhaust pipeline 5 is in communication with the exhaust chamber. In this way, the exhaust pipeline 5 is in communication with the exhaust holes H in the discharge pipeline 2 so that the gas out of the exhaust holes H passes through the exhaust pipeline 5 to an exhaust treatment system to be treated. An exhaust device such as a fan may be arranged on the exhaust pipeline to enhance the exhaust effect of the exhaust pipeline.

With the feeding device described in the embodiments of the disclosure, the gas-solid separation structure therein can separate medicine powder from gas, thereby preventing the gas from interfering with feeding of the medicine powder.

In some specific embodiments, the liquid medicine stirring tank 6 is provided with a stirring impeller and a heating member for heating the liquid medicine in the stirring tank. After reaching a target concentration and a target temperature, the liquid medicine in the liquid medicine stirring tank 6 may be transmitted to a main process device of an electrochemical deposition apparatus to subject an electrochemical deposition process.

In some specific embodiments, the discharge pipeline 2 is provided with a second valve K2, and the feeding device further includes a driver 8 that is configured to drive the second valve K2 to open in response to control of an exhaust control signal, and to drive the first valve K1 to open in response to control of at least a first feeding control signal.

In this embodiment, the driver 8 may include a cylinder, and before the medicine powder is added into the liquid medicine stirring tank 6, an exhaust control signal is transmitted to the driver 8 so that the driver 8 drives the second valve K2 to open, thereby exhausting the gas in the discharge pipeline 2. Thereafter, a first feeding control signal is transmitted to the driver 8 so that the driver 8 drives the first valve K1 to open, thereby adding the medicine powder into the liquid medicine stirring tank 6.

In some specific embodiments, the feeding device further includes a humidity detector configured to: monitor humidity within the discharge pipeline 2, and generate a second feeding control signal when the humidity within the discharge pipeline 2 is lower than a preset threshold value. The second feeding control signal may be transmitted to the driver 8 in a wireless or wired manner. The driver 8 is further configured to drive the first valve K1 to open in response to simultaneous control of the first and second feeding control signals.

In this embodiment, the driver 8 drives the first valve K1 to open only after receiving the first feeding control signal and the second feeding control signal. In this way, it is ensured that the discharge pipeline 2 and the second feeding part 12 are sufficiently dry when adding the medicine powder into the liquid medicine stirring tank 6, thereby preventing the medicine powder from adhering to the sidewall of the discharge pipeline 2 and the sidewall of the second feeding part 12.

The feeding device in the embodiment of the disclosure adopting the gas-solid separation structure as described above can separate the solid medicine powder from the gas, thereby preventing the gas from interfering with feeding of the solid medicine powder, and increasing the feeding accuracy. Further, the gas-solid separation structure is simple to control and easy to maintain.

In an embodiment of the present disclosure, there is further provided an electrochemical deposition apparatus including the feeding device as described above. In addition, the electrochemical deposition apparatus may further include a main process device for carrying out electrochemical deposition. The main process device may include: a tank body with a receiving tank, an electrode structure and a substrate carrier. The substrate carrier is configured to carry a substrate to be electroplated, and the electrode structure is provided in the receiving tank. The discharge port of the feeding device (i.e., the discharge port of the stirring tank) is in communication with the receiving tank, so as to supply a liquid medicine required for the electroplating (i.e., an electroplating solution including metal ions such as Cu) to the receiving tank. During the electrochemical deposition, the substrate carrier is connected to a cathode of a power supply, while the electrode structure is connected to an anode of a power supply, so that an electric field is generated between the substrate and the electrode structure. The metal ions in the electroplating solution are deposited on a surface of the substrate under an action of the electric field to form an electroplating film layer.

By adopting the electrochemical deposition apparatus disclosed by the embodiment of the disclosure, the gas-solid separation structure therein can separate medicine powder from gas, thereby preventing the gas from interfering with feeding of the medicine powder, and increasing the feeding accuracy.

It will be appreciated that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A gas-solid separation structure, comprising:
a feeding pipeline comprising a first feeding part, a second feeding part and a first valve disposed between the first and second feeding parts;
a discharge pipeline having a first opening and a second opening opposite to each other, the second feeding part extending into the discharge pipeline via the first opening;
wherein an exhaust channel is formed between the second feeding part and the discharge pipeline, exhaust holes are formed in a portion of the discharge pipeline opposite to the second feeding part, and the exhaust channel is in communication with the exhaust holes.

2. The gas-solid separation structure according to claim 1, wherein a discharge port of the second feeding part has a cross-sectional area smaller than a feeding port of the second feeding part.

3. The gas-solid separation structure according to claim 1, wherein the second feeding part has a cross-sectional area gradually reduced in a direction away from the first feeding part.

4. The gas-solid separation structure according to claim 1, wherein the discharge pipeline is provided with a second valve spaced from a discharge port of the feeding pipeline.

5. The gas-solid separation structure according to claim 1, wherein the exhaust holes are uniformly distributed along a circumferential direction of the discharge pipeline.

6. The gas-solid separation structure according to claim 1, wherein the first valve is disposed at the first opening of the discharge pipeline.

7. The gas-solid separation structure according to claim 1, wherein the feeding pipeline is disposed coaxially with the discharge pipeline.

8. The gas-solid separation structure according to claim 1, wherein the second feeding part is made of a metal material containing no iron element or a plastic material containing fluorine.

9. The gas-solid separation structure according to claim 1, wherein a height difference is provided between the exhaust hole farthest from the first feeding part and a discharge port of the second feeding part.

10. A feeding device, comprising: a material supply source, a delivering pipeline, an exhaust pipeline, a liquid medicine stirring tank, and the gas-solid separation structure of claim 1; wherein
the feeding pipeline is in communication with the material supply source via the delivering pipeline; and
the discharge pipeline is in communication with a feeding port of the liquid medicine stirring tank, while the exhaust holes in the discharge pipeline are in communication with the exhaust pipeline.

11. The feeding device according to claim 10, wherein the discharge pipeline is provided with a second valve spaced from a discharge port of the feeding pipeline, and the feeding device further comprises a driver that is configured to drive the second valve to open in response to control of an exhaust control signal; and to drive the first valve to open in response to control of at least a first feeding control signal.

12. The feeding device according to claim 11, wherein the feeding device further comprises a humidity detector configured to: monitor humidity within the discharge pipeline, and generate a second feeding control signal when the humidity within the discharge pipeline is lower than a preset threshold value;
the driver is further configured to drive the first valve to open in response to simultaneous control of the first and second feeding control signals.

13. An electrochemical deposition apparatus, comprising the feeding device of claim 10.

* * * * *